July 25, 1972 R. M. VANCAMP ET AL 3,679,373

REACTOR FOR USE WITH FLUIDIZED BEDS

Filed Dec. 16, 1968 3 Sheets-Sheet 1

INVENTORS
RAYMOND M. VAN CAMP
PAUL S. MINOR
ALBERT P. MUREN JR.

Chisholm and Spencer
ATTORNEYS

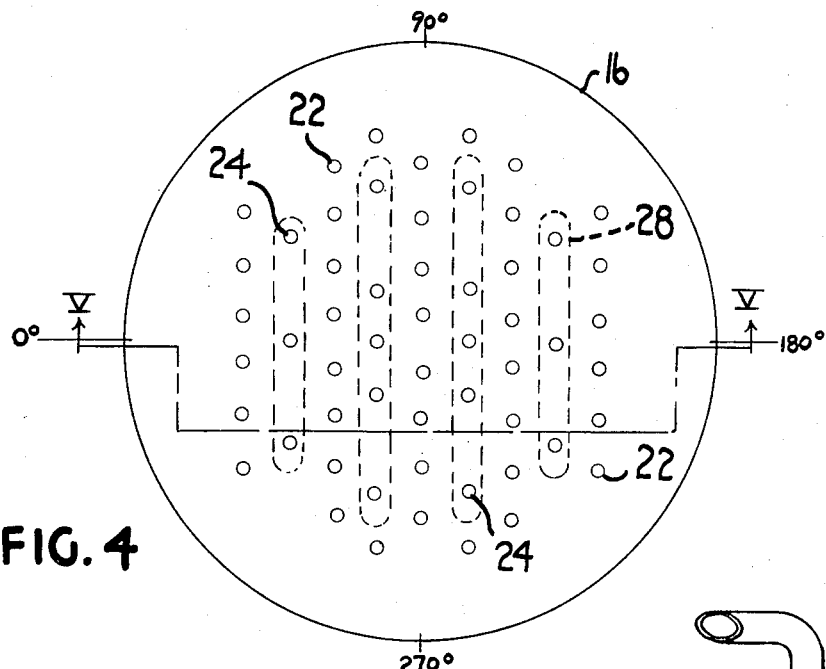
FIG. 4
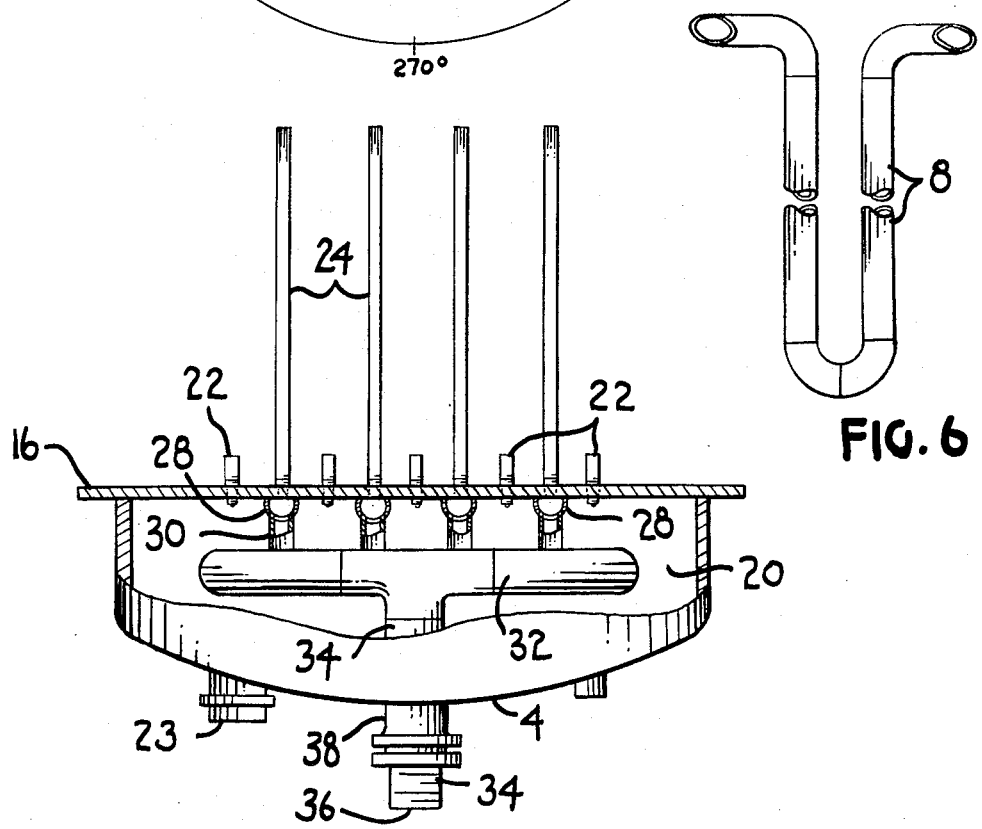
FIG. 5
FIG. 6
INVENTORS
RAYMOND M. VAN CAMP
PAUL S. MINOR
ALBERT P. MUREN JR.
BY Chisholm and Spencer
ATTORNEYS

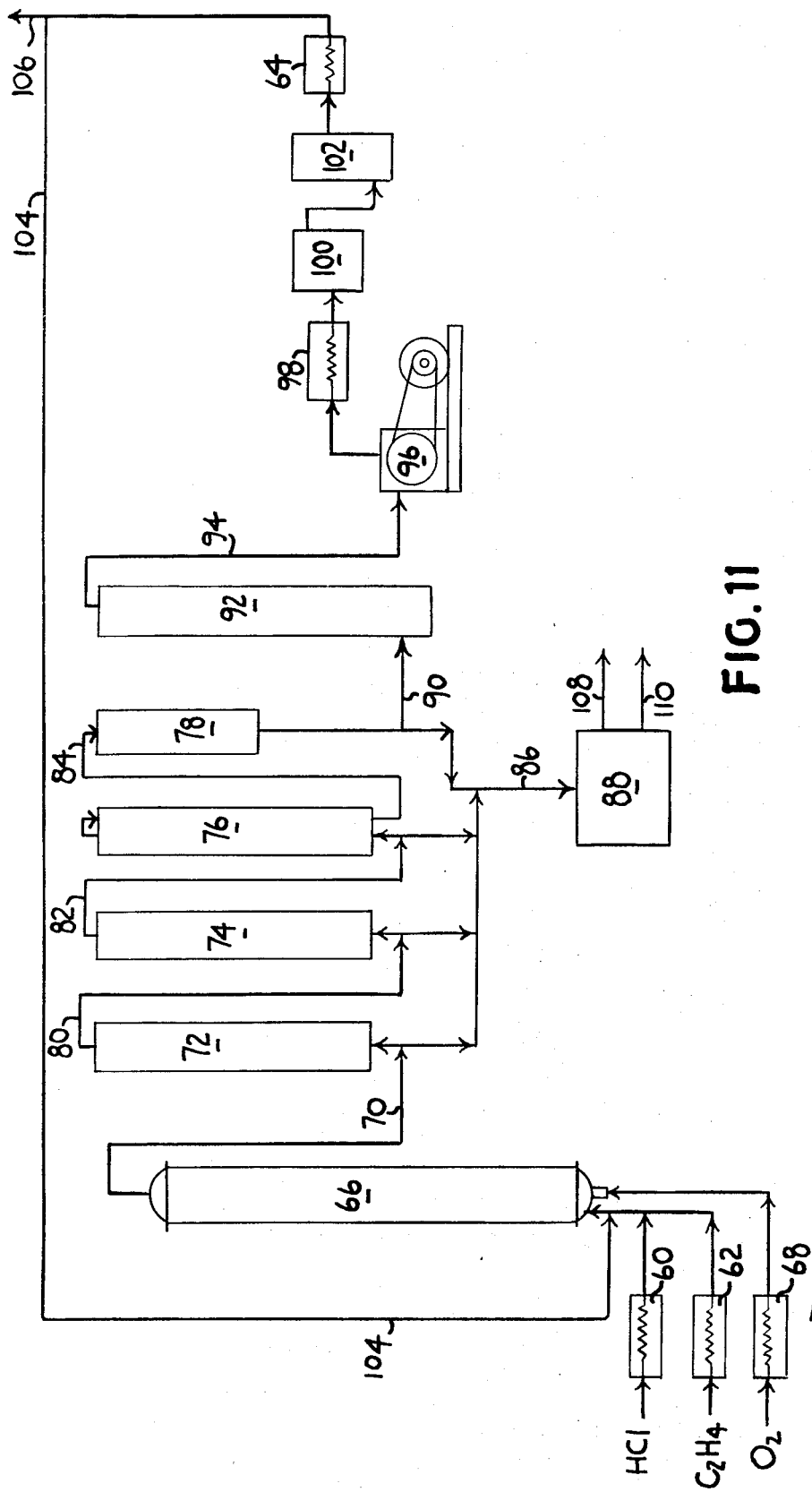

3,679,373
REACTOR FOR USE WITH FLUIDIZED BEDS

Raymond M. Vancamp, Pittsburgh, Pa., Paul S. Minor, New Martinsville, W. Va., and Albert P. Muren, Jr., Corpus Christi, Tex., assignors to PPG Industries, Inc., Pittsburgh, Pa.
Filed Dec. 16, 1968, Ser. No. 783,788
Int. Cl. C07c *17/00;* B01j *9/20*
U.S. Cl. 23—288 L                 19 Claims

---

ABSTRACT OF THE DISCLOSURE

Apparatus suitable for containing fluidized bed reactions is described. The apparatus includes a reaction chamber and points for the admission of reactants to the reaction chamber located in at least two levels. Conduit ordinarily used for transferring heat from the reaction chamber is located in close proximity to the higher level. Preferably, most of the surface of the conduit is substantially vertical.

---

THE INVENTION

Fluidized bed oxychlorination reactions are highly exothermic in nature and are conducted at elevated temperatures. In order to maintain a given reaction temperaure, the heat of reaction must be removed from the oxychlorination reactor. Such removal may be accomplished by removing the hot product stream, by transferring heat to a heat exchange surface located within or around the periphery of the reactor, or by radiating energy to the surroundings. These modes of heat removal usually occur simultaneously in differing degrees.

A great deal of the heat of reaction is removed from the reactor by transferring heat from the product gas stream to heat exchange surfaces contacting the fluidized bed. According to one mechanism, heat is directly transferred from the product gas stream directly to the cooling surfaces. According to another, heat is transferred from the gases to catalyst particles which, in turn, transfer this heat to the cooling surfaces.

When a material to be chlorinated and a chlorination agent are injected into a fluidized bed at or near the bottom thereof, and oxygen is injected at a location higher in the bed, most of the reaction occurs 0 to 36 inches above the injection point of the oxygen. The remaining portion of the fluidized bed functions primarily to transfer heat to heat transfer surfaces contacting the fluidized bed and located within the reactor or along its walls. In order to avoid close proximity with the reacting gases, it has been the practice in the past to locate internal cooling surfaces substantial distances away from the point of oxygen injection.

It has now been found advantageous to locate cooling surfaces within the fluidized bed close to the point of oxygen injection. This allows the component parts of the reactor to be placed in a smaller volume. Corrosion of the cooling surfaces is reduced since the turbulence of a fluidized bed increases as the distance from the bottom of the bed increases. The location of cooling surfaces near the point of oxygen injection is thought to reduce the formation of large bubbles of gases in the fluidized bed. Such large bubble formation is undesirable because it reduces the mutual contacting of the gases within the bubble and the catalyst particles.

For a better understanding of the invention, reference may be made to the drawings wherein like numerals refer to like parts and in which:

FIG. 4 is a plan view of the gas distribution arrangement as shown in FIG. 1;

FIG. 5 is a sectional view taken along the line V—V of FIG. 4;

FIG. 6 depicts one form of conduit shown in FIGS. 1 and 2;

FIG. 9 is a cross-section of a nozzle which may be used in accordance with this invention;

FIG. 10 is a cross-section of another nozzle which may be used in accordance with this invention; and FIG. 11 is a schematic drawing showing one manner of utilizing the present invention.

Figure 1:
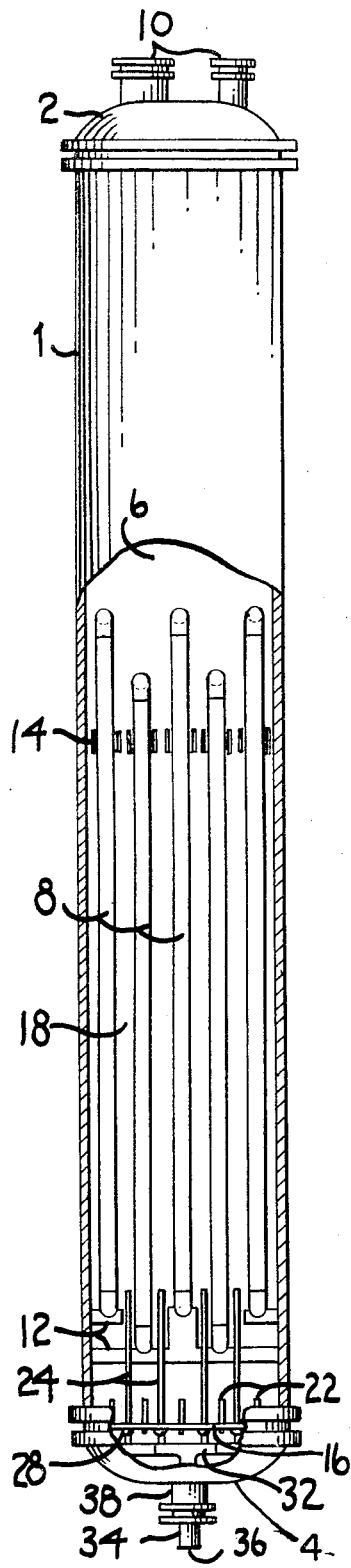
FIG. 1 illustrates an appropriate embodiment of an apparatus of the invention.

According to the present invention, heat is withdrawn through heat exchange surfaces which contact a fluidized bed of oxychlorination catalyst particles in the central region 0 to 36 inches above oxygen injection while reacting a chlorination agent, a material to be chlorinated, and oxygen in the fluidized bed at a temperature at from about 375° F. to about 1050° F. The sides of the central region as used throughout this specification and claims may be determined as follows. All points of reactant injection are projected into a plan view. The convex polygon of minimum area which contains all of the points of reactant injection is then determined on the plan view. The vertical projections of the sides of this polygon constitute the sides of the central region. The invention is particularly advantageous when applied to fluidized beds having a diameter of at least 15 inches.

The method of this invention may be conveniently carried out in a reactor which has a shell, a top and a bottom cooperating to define a chamber. At least one outlet communicates with the chamber near its top. One or more conduits are located within the chamber and have interiors which communicate solely without the chamber. A first series of passageways located near the bottom of the chamber provides communication between the chamber and a first header means. This first header means has at least one inlet communicating therewith. The first series of passageways are advantageously passageways in a first array of nozzles. Each nozzle of this array may have one or more passageways. A second series of passageways provides communication between the chamber and a second header means. This second header means, like the first header means, has at least one inlet communicating therewith. The second series of passageways are similarly advantageously passageways in a second array of nozzles. Each nozzle of this array may have one or more passageways. At least one outlet of the second series of passageways is higher than at least one outlet of the first series of passageways and at least a portion of the external surface of the conduit is located in the central region 0 to 36 inches above an outlet of the second series of passageways. It is preferred that all of the outlets of the second series of passageways be higher than all of the outlets of the first series of passageways. It is further preferred that the outlets of the first series of passageways lie in one horizontal plane and/or that the outlets of the second series of passageways lie in a second horizontal plane. The chamber preferably has a diameter of at least 15 inches and may, with advantage, exceed 27 inches or even 7 feet or more. In addition to the one or more conduits located within the chamber, a jacket may be provided around the exterior of the shell.

In another embodiment of this invention, none of the outlets of the second series of passageways on the plan view thereof constitute an apex of the polygon constructed as before described. Thus, in this embodiment, at least two outlets of the first series of passageways lie closer to the shell than any neighboring outlet of the second series of passageways.

Figure 2:
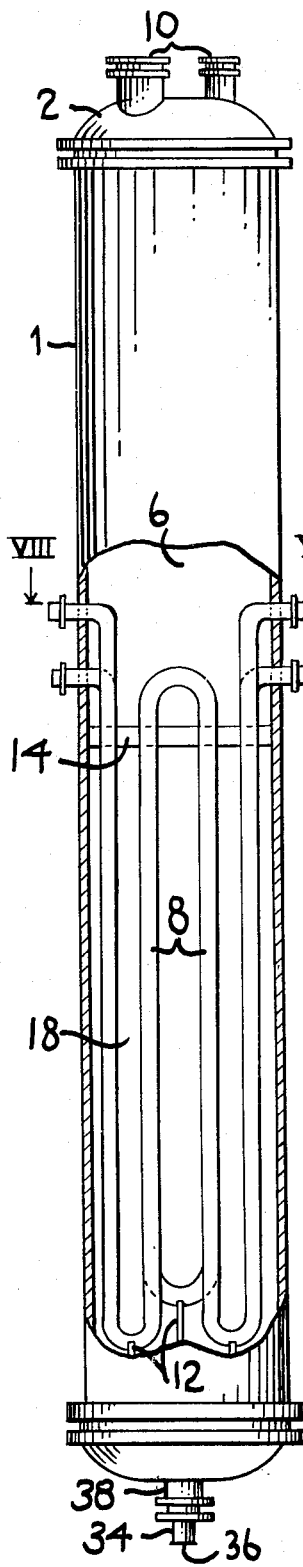
FIG. 2 is a profile view of the apparatus of FIG. 1.
Figure 8:
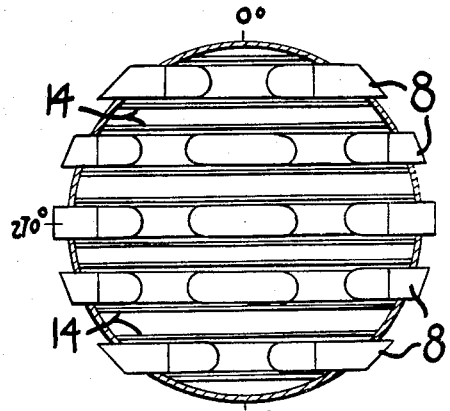
FIG. 8 is a sectional view taken along the line VIII—VIII of FIG. 2.
Figure 7:
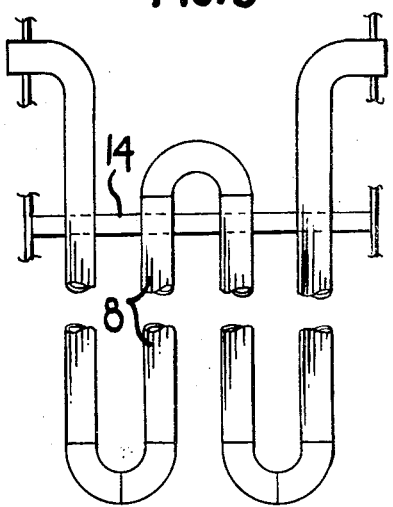
FIG. 7 depicts another form of conduit shown in FIGS. 1 and 2.

Referring now in detail to the drawings, there is shown in FIGS. 1 and 2 a reactor which has a shell 1, a top 2, and a bottom 4 which form a chamber 6. One or more outlets 10 are provided in the upper portion of the chamber 6. The conduits may advantageously be tubing formed into a serpentine configuration as shown, although other shapes of conduit may be utilized if desired. When serpentine-shaped conduits are used, they may have one or more return bends as shown in greater detail in FIGS. 6 and 7. Such conduits may have differing numbers of return bends to provide convenience in their location within the chamber, as shown in FIG. 8.

Figure 3:
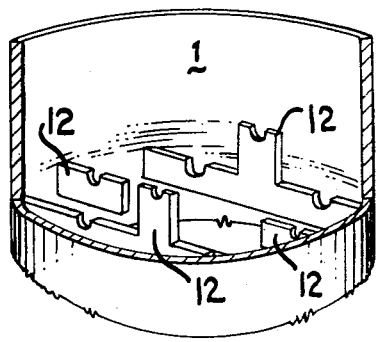
FIG. 3 depicts in greater detail the tube supports shown in FIG. 1.

The junctions of the conduits 8 with shell 1 are made fluid tight as by welds. Tube supports 12, shown in more detail in FIG. 3, affixed to shell 1 provide support for the conduits and fixedly position the lower portions thereof. Tube guides 14 maintain the upper portions of the conduits in a plane. A plate 16 is positioned between the top 2 and the bottom 4 and engages the shell 1 to divide the chamber 6 into an upper compartment 18 and a lower compartment 20, the latter shown in greater detail in FIG. 5. The lower compartment acts as a first header means for a first array of nozzles 22 which provides communication between the chamber and the first header means through at least one passageway 40 having at least one outlet 42 in each nozzle 22. The cross-sections of the passageways may be uniform throughout or they may vary from place to place along their centerline. A throttling orifice 44 may be used, for example, to provide a passageway of non-uniform cross-section. Inlet 23 provides communication between the lower compartment and the exterior of the apparatus. A second array of nozzles 24 provides communication between the chamber 6 and a second header means through at least one passageway 46 having at least one outlet 48 in each nozzle 24. The passageways in nozzles 24 may be of uniform or non-uniform cross-section at different locations throughout their length, as is the case with the passageways in nozzles 22. The second header means shown includes channels 28 affixed to the underside of plate 16 which isolate the entrances of the passageways in nozzles 24 from the entrances of the passageways in nozzles 22. Branch tubes 30 connect the channels 28 to transverse pipe 32 which is, in turn, connected to a supply pipe 34 having an inlet 36. Supply pipe 34 passes through bottom 4. Stuffing box 38 provides a fluid tight seal between the supply pipe 34 and bottom 4.

In operating the above-described apparatus to effect an oxychlorination reaction according to one embodiment of this invention, a mixture of the material to be chlorinated and chlorination agent is passed through inlet 23 into lower compartment 20 where it is introduced into the lower part of a fluidized bed of oxychlorination metal halide catalyst particles present in the upper compartment 18 through the passageways 40 in nozzles 22. Oxygen is passed through inlet 36, supply pipe 34, transverse pipe 32, branch tubes 30, and into the fluidized bed through the passageways 46 in nozzles 24. Consequently, the oxygen is introduced into the fluidized bed at a level above that at which the mixture of material to be chlorinated and the chlorination agent is introduced.

During reaction, the amount of catalyst particles and the rates of flow of the material to be chlorinated, chlorination agent and oxygen are maintained high enough to suspend the catalyst particles at least above the point of oxygen introduction. The upper surface of the fluidized bed is preferably maintained at about the top of the highest conduit, although greater or lesser bed heights may be used if desired. The top of the bed is preferably maintained well below the top of the column to provide a section of the chamber where the gas velocity is lower than in the fluidized bed. This lower velocity allows the bulk of the catalyst particles to fall back into the bed thereby tending to alleviate catalyst entrainment. Further disengagement of catalyst particles (particularly the fines produced by attrition) may be obtained by passing the gas stream through a solids separator, not shown, Exemplary of such a solids separator is a cyclone positioned near the top of the chamber and connected to outlet 10. The discharged end of the dip-leg is located well below the surface of the fluidized bed.

The catalyst employed by the oxychlorination reactions herein described is conveniently comprised of any of the well-known oxychlorination or Deacon type reaction catalysts impregnated on a suitable carrier or support. Catalysts of this type are, as a rule, metal halides, preferably chlorides of a multivalent metal such as copper, iron, chromium and the like. These metal halides, which are usually chlorides, may be utilized alone or may be combined with other metal halides such as alkali metal chlorides and alkaline earth metal chlorides, or mixtures thereof. Generally speaking, any Deacon type metal halide catalyst will satisfactorily produce chlorinated hydrocarbons from the reactants being fed to the oxychlorination zone. A particularly effective catalyst for this reaction is a copper chloride-potassium chloride catalyst. In any event, the preferred catalyst employed is one which contains a substantial quantity of copper chloride thereon. Such a catalyst particle usually contains thereon about 6 to 12 weight percent copper, although more or less may be used if desired.

Various carriers for the catalyst may be employed in conducting these reactions and materials such as silica, alumina, fuller's earth, kieselguhr, pumice and other like materials. The selection of the particular type of carrier will depend in great measure upon the turbulence of the bed, velocity of the gases, tolerable quantities of burning, and other similar considerations. Thus, a particularly effective carrier particle for utilization in the fluid beds contemplated herein is calcined fuller's earth. Such a material is manufactured by the Floridin Corporation, under the trade name "Florex."

Any technique may be employed for placing the catalyst material upon the carrier. Preferably, the process employed will be that found to accomplish the most uniform distribution of catalytic material upon the carrier. Thus, the carrier materials may simply be immersed in solutions containing the catalytic components, and the solvent evaporated from the carrier particles upon their removal from the solution. If desired, catalytic material may be sprayed upon the particles in mixing devices such as rotating tumblers, mix mullers and the like. Another effective method for impregnating carrier particles other than catalyst material is to spray into a fluidized bed of carrier particles a solution containing the catalyst. During fluidization and impregnation of the carrier particles, heat is applied to the fluidized bed by means of hot inert gases to vaporize the solvent, such as water, therefrom and leave behind the fluidized bed of carrier particles uniformly impregnated by the catalytic material to be employed.

The size of the catalyst impregnated particles may vary widely, but it has been found advantageous to use a particle size wherein at least 60 percent by weight of the particles fall in the range of 30 to 60 mesh (U.S. Sieve Series). This means that when the preferred catalyst is screened 60 percent by weight of the catalyst particles will pass through a 30 mesh screen but are retained by any of 40, 50, and 60 mesh screens. It is to be understood, of course, that the distribution of particle sizes will vary as the particles are used.

The materials to be chlorinated in accordance with the oxychlorination procedures of the present invention may be widely varied. Examples of such materials are lower aliphatic hydrocarbons containing from 1 to 4 carbon atoms and their partially chlorinated derivatives. Thus, hydrocarbons such as methane, ethane, propane, ethylene and chlorohydrocarbons such as 1,2-dichloroethane, chloroethane and the tetrachloroethanes may be used in oxychlorination reactions.

The chlorination agent used may be selected from the group consisting of chlorine, hydrogen chloride, and mixtures of chlorine and hydrogen chloride.

Oxygen fed to the reaction may have a purity in excess of 98 percent by weight, or it may be diluted with gases or vapors which are generally inert under the process conditions. Thus, oxygen, oxygen-enriched air, air, air mixed with inert gases or vapors or mixtures of oxygen, air and inert gases or vapors may be conveniently utilized in accordance with the teachings of the present invention. In the preferred operation, high purity oxygen is conveniently employed.

The temperature of the fluidized reaction bed may be varied considerably in accordance with the practice and teachings of the present invention and will depend in some measure upon the particular hydrocarbon and/or partially chlorinated derivatives thereof fed thereto. Generally, reaction temperatures fall in the range of about 375° F. to about 1050° F. Usually, ethylene is oxychlorinated to 1,2-dichloroethane at a temperature in the range of about 450° F. to about 600° F., whereas 1,2-dichloroethane is oxychlorinated to produce perchloroethylene and trichloroethylene in the range of about 750° F. to about 850° F.

The oxychlorination fluidized bed operation may be conducted under atmospheric conditions of pressure, although greater or lesser pressures may be used if desired. Thus, pressure may be applied to the oxychlorination reaction being conducted in the fluidized bed to thereby give rise to increased productivity. More normally, however, the reactor is operated under conditions of slight pressure, e.g., in the range of about 0.5 to about 100 pounds per square inch gauge. Even greater pressures may be used if desired.

Reaction products are collected from the upper portion of the fluidized bed and removed from the reaction zone. Usually the upward flow of gases sweeps out the products of reaction along with any unreacted or inert constituents. The reaction products from these operations are comprised of various chlorinated organic derivatives of the hydrocarbon and/or partially chlorinated derivatives thereof fed to the reaction zone. Generally, the organic products are condensed and/or absorbed and after purification and water removal steps following the conventional practices of the art, the desired organic chlorinated hydrocarbon products are separated from each other by recourse to fractional distillation, selective absorption and desorption operations, and other like separation processes.

A preferred embodiment of the present invention serves to effectively reduce the formation of hot spots and clinkers. When the circulation of the reacting gases in a localized zone is reduced, poor heat transfer of the reaction exotherm occurs. This causes a localized temperature higher than the average temperature immediately surrounding the zone. Such zones of high temperatures are known as hot spots.

These hot spots, if allowed to continue, will cause clinkers, which are primarily aggregates of fused catalyst particles, to grow in size and will eventually cause fusion of the nickel alloy or other similar construction material at that point.

It may be seen that when heat exchange surfaces are introduced into close proximity to the oxygen nozzles, the danger of hot spot and clinker formation is increased. It has now been found that solid surfaces may be permitted in that portion of the bed where most of the reaction takes place without causing a substantial increase in hot spot and clinker formation if the solid surfaces are such that they do not cause local zones of poor circulation. According to a preferred embodiment of the present invention, the oxygen is injected substantially vertically into the fluidized bed and the heat exchange surfaces contacting the fluidized bed in a central region 0 to 36 inches above oxygen injection are substantially vertical. The sides of the region are as previously defined. Departures from verticality on the order of 10° or 20° may ordinarily be permitted. It is most preferred, of course, that substantially all surfaces contacting the fluidized bed in this central region be substantially vertical. Thus, tube supports, thermowells, and similar surfaces are advantageously located without the central region. It is to be understood, of course, that minor departures from verticality will not always cause a hot spot and that judicious experimentation will possibly find a few locations within the central region where departures from verticality may safely occur. Streamlining of such surfaces will also help to reduce the formation of hot spots and clinkers.

The heat exchange surfaces of an apparatus utilizing the principles of the preferred embodiment may be a conduit which has substantially vertical external surfaces, an upper level of external surfaces which substantially depart from verticality and a lower level of external surfaces which substantially depart from verticality, at least a portion of the substantially vertical external surfaces being located in the region 0 to 36 inches above the level of the outlets of nozzles 24. The serpentine-shaped conduits shown in FIGS. 1, 2, 6, 7 and 8 may be used to advantage. Such conduits have an upper level of bends and a lower level of bends with intervening straight runs, portions of the straight runs passing through the stated region vertically.

The likelihood of hot spot and clinker formation may be reduced even further if the central region of the reactor from 0 to 36 inches above the outlets of the passageways of the nozzles 24 is free of substantially all external obstructive surfaces. As used in the present specification and claims, an "external obstructive surface" is defined as a solid surface which will first intercept lines as they are projected vertically from the bottom to the top of the reactor. Preferably, substantially all external surfaces in the stated portion of the central region are substantially vertical.

In a further preferred embodiment, none of the points of oxygen injection as projected on the plan view constitute an apex of the polygon constructed as heretofore described. In other words, in this embodiment, at least two injection points of reactants other than oxygen lie closer to the side of the fluidized bed than any neighboring points of oxygen injection. This tends to insure that oxygen will be injected only into a well fluidized portion of the bed, thereby discouraging the formation of hot spots and clinkers.

The basic principles of the present invention have been incorporated by way of example in the following specific embodiments.

EXAMPLE I

A reactor embodying the features shown in the figures was constructed using Inconel, a high nickel content (greater than 75 percent by weight) alloy for the interior surfaces. The length of the shell was 18 feet face-to-face of the flanges and its diameter was 28 inches. The serpentine-shaped conduits were fabricated from two-inch (nominal) Schedule 10 tubing and 90° long radius ells. All conduits were 11 feet in length from the centerline of the upper 90° bends to the centerline of the lower return bends. The centerline of the upper return bends of those conduits having three return bends was 10½ feet above the centerilne of the lower return bends. The centerline of each conduit lay in a vertical plane. These vertical planes were spaced 5 inches apart with the central plane also containing a diameter of the shell. The centerlines of the central and exterior conduits passed through the shell 12½ feet above the lower flange face of the shell while the centerlines of the two intermediate conduits passed through the shell 6 inches lower. Tube supports were positioned immediately below each lower return bend. The distributor plate contained nozzles set on a 2¾ inch triangular pitch. The sixteen nozzles communicating with the channels, branch tubes, transverse pipe and supply pipe each had a single 5/64 inch passageway outlet 19 inches above the plate and directed substantially vertically. A small offset amounting to a fraction of an inch was placed in each of the four corner nozzles in order to clear the tube supports. Four 5/32 inch outlets of the passageways in each of the remaining 40 nozzles were about an inch above the plate and were directed 30° below the horizontal.

The nearest external obstructive surfaces above the outlets of the 19-inch nozzles were the tube guides whose lower surfaces were 11 feet, 1½ inches above the lower flange face of the shell.

EXAMPLE II

Florex particles having distributed thereon $CuCl_2$ and KCl were utilized as catalyst particles for the oxychlorination of ethylene to 1,2-dichloroethane. These catalyst particles contained about 7 percent Cu and about 5 percent K by weight. Over 70 percent by weight were sized between 30 and 60 mesh. Enough catalyst to establish a desired bed height was added to the reactor of Example I. This reactor was a component of the system shown schematically in FIG. 11. A mixed feed gas comprising a mixture of hydrogen chloride, ethylene and recycled gas heated to a temperature of about 250° F. in heat exchangers 60, 62 and 64, respectively, was introduced into the fluidized bed in reactor 66 through the 40 short nozzles. Oxygen heated to a temperature of about 250° F. in heat exchanger 68 was injected through the 16 long nozzles. Therminol heat exchange fluid was circulated through the serpentine tubes of the reactor and through the tubes of a water cooler, not shown, where heat was removed from the heat exchange fluid. The gaseous product stream issuing from the reactor through line 70 was passed into a condensing system consisting of three water-cooled condensers 72, 74 and 76 and a refrigerated condenser 78 connected in series by lines 80, 82 and 84, respectively. Condensates from the condensers were mixed and sent through line 86 through phase separator 78 at a temperature of from about 40 to about 50° F. and was transferred through line 90 into water scrubber 92. The scrubbed gas was then passed through line 94 into compressor 96. After compression to a pressure of about 25 pounds per square inch gauge, the gas stream was cooled in water-cooled heat exchanger 98 to lower the dew point and passed through a knockout tank 100 and demister 102 for removal of condensed water. The gas stream was then heated to about 250° F. in heat exchanger 64 and passed through line 104 and added as recycle to the mixture of hydrogen chloride and ethylene to form a mixed feed to the reactor. From time to time the accumulation of inert gases such as carbon monoxide, carbon dioxide, or nitrogen was removed from line 104 through purge vent 106. The condensate sent to phase separator 88 was phase separated into an aqueous phase which was discarded through line 108 and an organic phase which was sent to product recovery through line 110. For the sake of clarity in setting forth the nature of the system, parts of the apparatus such as valves, heat exchange fluid circuits, flow indicators, pressure indicators, temperature indicators and the like, not essential to a complete understanding of the invention have been omitted from FIG. 11. The reactor was run under the following conditions:

| Ex. | Bed height, ft. | Avg. bed temp., °F. | Reactor[1] pressure, p.s.i.g. | Coolant flow, gal./min. | Coolant temp., °F. | | Feed | | | | | | | | Superficial gas velocity,[2] ft./sec. |
|---|---|---|---|---|---|---|---|---|---|---|---|---|---|---|---|
| | | | | | In | Out | $C_2H_4$ | | $O_2$ | | HCl | | Recycle | | |
| | | | | | | | Lb. | Lb./hr. | Lb. | Lb./hr. | Lb. | Lb./hr. | Lb. | Lb./hr. | |
| III | 12 | 521.6 | 3.3 | 39.9 | 378.3 | 384.2 | 2989.5 | 124.5 | 1871.4 | 78.0 | 7860.1 | 327.0 | 3072.0 | 128.0 | 0.88 |
| IV | 12 | 522.7 | 2.2 | 39.9 | 376 | 382.2 | 3135.0 | 130.6 | 1923.2 | 80.2 | 8025.5 | 334.0 | 3060.0 | 127.6 | 0.97 |
| V | 8 | 526 | 3.7 | 33.2 | 313.2 | 305.6 | 1546.4 | 118.9 | 925.1 | 71.1 | 3935.4 | 302.6 | 1219.4 | 93.8 | 0.78 |
| VI | 12 | 523 | 1.0 | 17.0 | 346.5 | 362 | 1654.0 | 110.2 | 954.6 | 63.6 | 4315.8 | 287.7 | 534.4 | 35.6 | 0.75 |

[1] At top of reactor.
[2] Based on total moles of gas entering bottom of reactor and pressure at top of reactor.

| | Products | | | | | | Crude analysis, percent | | | | Vent analysis, percent | | | |
|---|---|---|---|---|---|---|---|---|---|---|---|---|---|---|
| | Aqueous phase | | Crude[1] | | Vent | | | | | | | | | |
| Ex. | Lb. | Lb./hr. | Lb. | Lb./hr. | Lb. | Lb./hr. | EDC[2] | $CCl_4$ | Chloral | TCE[3] | $O_2$ | $C_2H_4$ | $CO_2$ | Organics |
| III | 1,856.0 | 77.3 | 10,429.0 | 434.5 | 107.9 | 4.5 | 98.53 | 0.12 | 0.27 | 0.88 | 6.58 | 53.53 | 35.02 | 1.26 |
| IV | 2,044.4 | 85.3 | 10,832.0 | 451.3 | 101.7 | 4.2 | 98.76 | 0.09 | 0.26 | 0.75 | 7.27 | 52.47 | 35.38 | 1.08 |
| V | 1,024.0 | 78.8 | 5,254.0 | 404.2 | 46.7 | 3.6 | 98.60 | 0.06 | 0.20 | 0.95 | 13.57 | 50.92 | 28.25 | 2.89 |
| VI | 1,256.0 | 83.7 | 5,499.0 | 366.6 | 101.4 | 6.8 | 98.34 | 0.01 | 0.49 | 0.93 | 11.30 | 73.89 | 6.71 | 4.41 |

| | $C_2H_4$ utilizations, percent | | | | | HCl utilizations, percent | | | | | $C_2H_4$ conversion, percent | All materials | | |
|---|---|---|---|---|---|---|---|---|---|---|---|---|---|---|
| | Total organics | Condensed | | Unreacted $C_2H_4$ | Burn | Carbon closure, percent | Total organics | Condensed | | Unreacted HCl | Chlorine closure, percent | | In, lb./hr. | Out, lb./hr. | Closure, percent |
| Ex. | | Organics | EDC | | | | | organics | EDC | | | | | | |
| III | 98.28 | 98.23 | 97.22 | 1.55 | 0.54 | 100.37 | 98.03 | 97.99 | 96.40 | 1.33 | 99.36 | 68.5 | 529.5 | 516.3 | 97.4 |
| IV | 97.41 | 97.37 | 96.51 | 1.37 | 0.49 | 99.27 | 99.68 | 99.64 | 98.29 | 1.34 | 101.02 | 69.6 | 544.8 | 540.8 | 99.2 |
| V | | 96.2 | 94.92 | 1.29 | 0.38 | 97.79 | | | 97.67 | 1.87 | 100.23 | 75.0 | 492.6 | 486.6 | 98.8 |
| VI | | 95.9 | 94.33 | 3.87 | 0.25 | 100.25 | | | 92.32 | 5.50 | 99.52 | 87.7 | 461.5 | 457.1 | 99.0 |

[1] Organic phase after phase separation.
[2] EDC=1,2-dichloroethane.
[3] TCE=1,1,2-trichloroethane.

The use of a recycle stream, while usually desirable, is not necessary. Consequently, a once-through system may be used, if desired.

While the invention has been described with reference to certain illustrative embodiments, it is not intended that it be limited thereby except insofar as appears in the accompanying claims.

We claim:
1. An apparatus comprising:
   (a) a shell, a top and a bottom, cooperating to define a chamber;
   (b) at least one conduit located within said chamber, the interior of said conduit communicating solely without said chamber;
   (c) a first header means;
   (d) a first series of passageways located near the bottom of said chamber which provides direct communication between said first header means and said chamber through outlets located within said chamber;
   (e) a second header means;
   (f) a second series of passageways located near the bottom of said chamber which provides direct communication between said second header means and said chamber through outlets located within said chamber;
(g) at least one reactant feed inlet located outside the chamber which directly communicates with said first header means;
(h) at least one reactant feed inlet located outside the chamber which directly communicates with said second header means;
(i) at least one reaction product outlet which directly communicates with said chamber and is located near the top thereof;
(j) at least one outlet of the second series of passageways being:
(1) higher than at least one outlet of the first series of passageways, and
(2) higher than the bottom of said conduit;
(k) at least a portion of the external surface of said conduit being located in the central region 0 to 36 inches above said outlet of the second series of passageways, said central region being determined as follows:
(1) all points of reactant injection are projected into a plan view.
(2) the convex polygon of minimum area which contains all of the points of reactant injection is then determined on the plan view, and
(3) the sides of said convex polygon are projected vertically to define the sides of the central region.

2. An apparatus comprising:
(a) a shell, a top and a bottom, cooperating to define a chamber;
(b) at least one conduit located within said chamber, the interior of said conduit communicating solely without said chamber;
(c) a first header means;
(d) a first series of passageways located near the bottom of said chamber which provides direct communication between said first header means and said chamber through outlets located within said chamber;
(e) a second header means;
(f) a second series of passageways located near the bottom of said chamber which provides direct communication between said second header means and said chamber through outlets located within said chamber;
(g) at least one reactant feed inlet located outside the chamber which directly communicates with said first header means;
(h) at least one reactant feed inlet located outside the chamber which directly communicates with said second header means;
(i) at least one reaction product outlet which directly communicates with said chamber and is located near the top thereof;
(j) at least one outlet of the second series of passageways being:
(1) higher than at least one outlet of the first series of passageways;
(2) directed substantially vertically, and
(3) higher than the bottom of said conduit;
(k) at least a portion of the external surface of said conduit being substantially vertical and located in the central region 0 to 36 inches above said outlet of the second series of passageways, said central region being determined as follows:
(1) all points of reactant inejction are projected into a plan view,
(2) the convex polygon of minimum area which contains all of the points of reactant injection is then determined on the plan view, and
(3) the sides of said convex polygon are projected vertically to define the sides of the central region.

3. The apparatus of claim 2 wherein at least two outlets of the first series of passageways lie closer to said shell than any neighboring outlet of the second series of passageways.

4. The apparatus of claim 3 wherein said central region 0 to 36 inches above said outlet of the second series of passageways is substantially free of external obstructive surfaces, said external obstructive surfaces being those solid surfaces which will first intercept lines as they are projected vertically from the bottom to the top of the reactor.

5. The apparatus of claim 4 wherein said chamber has a diameter of at least 15 inches.

6. An apparatus comprising:
(a) a shell, a top and a bottom cooperating to define a chamber;
(b) at least one conduit located within said chamber, the interior of said conduit communicating solely without said chamber;
(c) a first array of nozzles located near the bottom of said chamber which provides direct communication between said chamber and a first header means through at least one passageway in each nozzle in said first array;
(d) a second array of nozzles located near the bottom of said chamber which provides direct communication between said chamber and a second header means through at least one passageway in each nozzle in said second array;
(e) at least one reactant feed inlet located outside the chamber which directly communicates with said first header means;
(f) at least one reactant feed inlet located outside the chamber which directly communicates with said second header means;
(g) at least one reaction product outlet which directly communicates with said chamber and is located near the top thereof;
(h) at least one outlet of a passageway of a nozzle of said second array being
(1) higher than at least one outlet of a passageway of a nozzle of said first array, and
(2) higher than the bottom of said conduit;
(i) at least a portion of the external surface of said conduit being located in the central region 0 to 36 inches above said outlet of said passageway of said nozzle of said second array, said central region being determined as follows:
(1) all points of reactant injection are projected into a plan view,
(2) the convex polygon of minimum area which contains all of the points of reactant injection is then determined on the plan view, and
(3) the sides of said convex polygon are projected vertically to define the sides of the central region.

7. An apparatus comprising:
(a) a shell, a top and a bottom cooperating to define a chamber;
(b) at least one conduit located within said chamber, the interior of said conduit communicating solely without said chamber;
(c) a first array of nozzles located near the bottom of said chamber which provides direct communication between said chamber and a first header means through at least one passageway in each nozzle in said first array;
(d) a second array of nozzles located near the bottom of said chamber which provides direct communication between said chamber and a second header means through at least one passageway in each nozzle in said second array;
(e) at least one reactant feed inlet located outside the chamber which directly communicates with said first header means;

(f) at least one reactant feed inlet located outside the chamber which directly communicates with said second header means;

(g) at least one reaction product outlet which directly communicates with said chamber and is located near the top thereof;

(h) at least one outlet of a passageway of a nozzle of said second array being:
  (1) higher than at least one outlet of a passageway of a nozzle of said first array,
  (2) directed substantially vertically, and
  (3) higher than the bottom of said conduit;

(i) at least a portion of the external surface of said conduit being substantially vertical and located in the central region 0 to 36 inches above said outlet of said passageway of said nozzle of said second array, said central region being determined as follows:
  (1) all points of reactant injection are projected into a plan view;
  (2) the convex polygon of minimum area which contains all of the points of reactant injection is then determined on the plan view, and
  (3) the sides of said convex polygon are projected vertically to define the sides of the central region.

8. The apparatus of claim 7 wherein said central region 0 to 36 inches above said outlet of the passageway of the nozzle of said second array is substantially free of external obstructive surfaces, said external obstructive surfaces being those solid surfaces which will first intercept lines as they are projected vertically from the bottom to the top of the reactor.

9. The apparatus of claim 8 wherein said chamber has a diameter of at least 15 inches.

10. The apparatus of claim 9 wherein said conduit comprises tubing.

11. The apparatus of claim 9 wherein said conduit also includes an upper level of external surfaces which substantially depart from verticality and a lower level of external surfaces which substantially depart from verticality.

12. The apparatus of claim 11 wherein said lower level of surfaces are located below the outlets of the passageways of the nozzles of second array.

13. The apparatus of claim 11 wherein said conduit comprises tubing.

14. The apparatus of claim 13 wherein said tubing is in a serpentine configuration.

15. The apparatus of claim 9 wherein said first header means comprises a portion of a lower compartment formed by a plate engaging said shell and positioned between said top and said bottom to divide said chamber into an upper compartment and said lower compartment and wherein the nozzles of both arrays engage said plate and provide communication therethrough.

16. The apparatus of claim 9 including means within said chamber for supporting said conduit, said means being located without said central region.

17. An apparatus comprising:
(a) a shell, a top and a bottom cooperating to define a chamber;
(b) at least one conduit located within said chamber, the interior of said conduit communicating solely without said chamber;

(c) a first array of nozzles located near the bottom of said chamber which provides direct communication between said chamber and a first header means through at least one passageway in each nozzle in said first array;

(d) a second array of nozzles located near the bottom of said chamber which provides direct communication between said chamber and a second header means throught least one passageway in each nozzle in said second array;

(e) at least one reactant feed inlet located outside the chamber which directly communicates with said first header means;

(f) at least one reactant feed inlet located outside the chamber which directly communicates with said second header means;

(g) at least one reaction product outlet which directly communicates with said chamber and is located near the top thereof;

(h) the outlets of the passageways of the nozzles of said second array being:
  (1) higher than the outlets of the passageways of the nozzles of said first array,
  (2) directed substantially vertically, and
  (3) higher than the bottom of said conduit;

(i) at least a portion of the external surface of said conduit being located in the central region 0 to 36 inches above the outlets of the passageways of the nozzles of said second array, said central region being determined as follows:
  (1) all points of reactant injection are projected into a plan view,
  (2) the convex polygon of minimum area which contains all of the points of reactant injection is then determined on the plan view, and
  (3) the sides of said convex polygon are projected vertically to define the sides of the central region.

18. The apparatus of claim 17 wherein said central region 0 to 36 inches above said outlets of the passageways of the nozzles of said second array is substantially free of external obstructive surfaces, said external obstructive surfaces being those solid surfaces which will first intercept lines as they are projected vertically from the bottom to the top of the reactor.

19. The apparatus of claim 18 wherein said chamber has a diameter of at least 15 inches.

References Cited
UNITED STATES PATENTS

| | | | |
|---|---|---|---|
| 2,475,025 | 7/1949 | Huff | 260—449.6 |
| 2,620,262 | 12/1952 | Hujsak et al. | 23—28.91 |
| 2,842,102 | 7/1958 | Blaskoweki | 122—4 D |
| 3,378,597 | 4/1968 | Dehn et al. | 260—652 P |
| 2,503,291 | 4/1950 | Odell | 260—449 |
| 1,835,046 | 12/1931 | Hickey et al. | 165—146 |

JAMES H. TAYMAN, Jr., Primary Examiner

U.S. Cl. X.R.

23—1 F, 288 S; 260—654, 659, 694, 700; 165—140, 146, 163, 158